US009715060B2

(12) United States Patent
Sasaki

(10) Patent No.: US 9,715,060 B2
(45) Date of Patent: Jul. 25, 2017

(54) LIGHT SOURCE DEVICE AND DISPLAY APPARATUS

(71) Applicant: Sakai Display Products Corporation, Sakai-shi, Osaka (JP)

(72) Inventor: Tomoo Sasaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/896,516

(22) PCT Filed: Jun. 16, 2014

(86) PCT No.: PCT/JP2014/065899
§ 371 (c)(1),
(2) Date: Dec. 7, 2015

(87) PCT Pub. No.: WO2014/208385
PCT Pub. Date: Dec. 31, 2014

(65) Prior Publication Data
US 2016/0139329 A1 May 19, 2016

(30) Foreign Application Priority Data

Jun. 27, 2013 (JP) ................................. 2013-135407

(51) Int. Cl.
*F21V 8/00* (2006.01)
*G02F 1/1333* (2006.01)
*G02F 1/1335* (2006.01)

(52) U.S. Cl.
CPC ......... *G02B 6/0088* (2013.01); *G02B 6/0091* (2013.01); *G02F 1/133308* (2013.01); *G02F 1/133608* (2013.01); *G02F 2001/133314* (2013.01)

(58) Field of Classification Search
CPC ............... G02B 6/0088; G02B 6/0091; G02F 1/133308; G02F 1/133608; G02F 2001/13314
See application file for complete search history.

(56) References Cited

U.S. PATENT DOCUMENTS

2012/0120326 A1 5/2012 Takata
2012/0293728 A1 11/2012 Yokohama
2013/0120669 A1 5/2013 Kuromizu

FOREIGN PATENT DOCUMENTS

| JP | WO 2012002074 A1 * | 1/2012 | ........... G02B 6/0033 |
| WO | WO2011013406 A1 | 2/2011 | |
| WO | WO2011093136 A1 | 8/2011 | |
| WO | WO2012002074 A1 | 1/2012 | |

* cited by examiner

*Primary Examiner* — David V Bruce
(74) *Attorney, Agent, or Firm* — Bret E. Field; Bozicevic, Field & Francis LLP

(57) ABSTRACT

Light sources are disposed to face two opposite end surfaces of light guide plate. Cutout parts are provided at respective centers of other two opposite end surfaces of the light guide plate. Pinching members which pinch the light guide plate are attached to rear cover which covers one surface of the light guide plate, the pinching members being at positions corresponding to the respective cutout parts of the light guide plate. The rear cover pinches the other two opposite end surfaces of the light guide plate by two pinching members, while supporting the one surface of the light guide plate.

6 Claims, 10 Drawing Sheets

F I G. 6
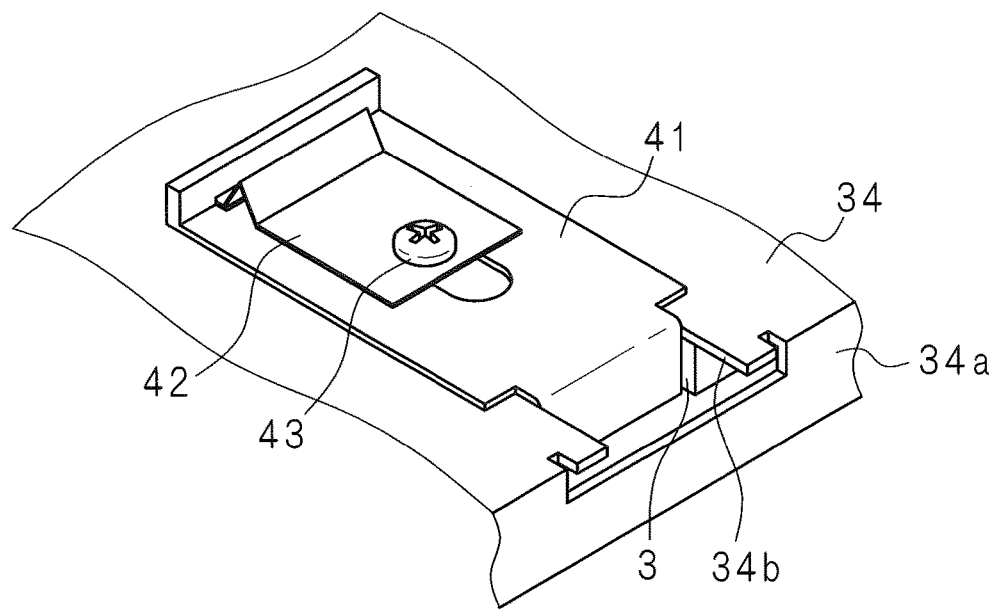

LIGHT SOURCE DEVICE AND DISPLAY APPARATUS

CROSS-REFERENCE TO RELATED APPLICATION

This application is the national phase under 35 U.S.C. §371 of PCT International Application No. PCT/JP2014/065899 which has an International filing date of Jun. 16, 2014 and designated the United States of America.

BACKGROUND

1. Technical Field

The present invention relates to an edge light type light source device, and a display apparatus including the light source device.

2. Description of Related Art

Recently, a display apparatus such as a liquid crystal display and a liquid crystal television has been widely spread. Such the display apparatus includes: a rectangular plate-shaped display panel which has a display screen displaying an image on a front side; and a light source unit which is disposed on a rear side of the display panel to emit light to the display panel. There is an edge light type light source unit in which a light guide plate and a support member for supporting the light guide plate are disposed on the rear side of the display panel, and a light source such as a light emitting diode (LED) is disposed on an end surface (side surface) side of the light guide plate. In the edge light type light source unit, light made incident on the end surface of the light guide plate is emitted from one surface of the light guide plate while diffusing in the light guide plate, and is made incident on the display panel.

In the edge light type light source unit, in order to uniformly emit the light, it is necessary to prevent a positional relation between the light guide plate and the light source from being shifted, and it is important to maintain a distance between the light guide plate and the light source constant.

Further, International Publication No. 2011/093136 proposes a device in which a regulating part which regulates a distance between an LED light source on an LED substrate and a light guide plate is provided in a substrate holding member which holds the LED substrate. In addition, research has been conducted to secure the constant distance between the light source and the light guide plate by installing an elastic member made of, for example, a silicon rubber between the substrate (LED substrate) mounted with the light source and the light guide plate.

SUMMARY

However, as the display apparatus is thinned and narrowed, thinning and miniaturizing of the light source unit are required, and thus it is difficult to provide the regulating part as disclosed in International Publication No. 2011/093136 in the substrate holding member. In general, the display apparatus is often used with being erected, and in the configuration in which the light source is disposed on upper and the lower surface sides of the light guide plate, as the size of the light guide plate becomes larger due to increasing the size of the display panel, the light guide plate is downwardly shifted due to its own weight, and a condition in which the installed elastic member is deformed occurs. Further, in the edge light type light source unit, heat generated during emitting light by the light source is conducted to the light guide plate, and thus the light guide plate may be expanded due to the heat from the light source. When such the heat expansion and position shift of the light guide plate due to its own weight have simultaneously occurred, the light guide plate may contact the light source to damage the light source.

The present invention has been made with the aim of solving the above problems. It is an object of the present invention to provide a light source device which is capable of miniaturizing and appropriately maintaining a position of a light guide plate with respect to a light source unit, and a display apparatus including the light source device.

A light source device according to the present invention comprises: a rectangular light guide plate; light source units which are disposed to face two opposite end surfaces of the light guide plate; and a holding member which holds the light source units and the light guide plate. In the light source device, light made incident on the two end surfaces of the light guide plate from the light source units is emitted from one surface of the light guide plate. Further, the light source device comprises pinching units which are attached to the holding member to pinch the other two end surfaces of the light guide plate.

According to the present invention, since the light guide plate is pinched through the two end surfaces in which the light source units are not disposed, it is possible to stably maintain the position of the light guide plate with respect to the light source units. Thereby, it is possible to achieve the light source device that can uniformly emit light. In addition, since pinching units are provided on the two end surface sides in which the light source units are not disposed, a configuration of the two end surface sides in which the light source units are disposed is not complicated, and the light source device can be miniaturized.

In the light source device according to the present invention, each of the pinching units has an elastic member biased in a direction approaching each other.

According to the present invention, since the light guide plate is pinched by the elastic members, for example, even if the light guide plate is expanded due to heat from the light source units, the light guide plate can be stably pinched. Thereby, it is possible to stably maintain the position of the light guide plate.

In the light source device according to the present invention, the light guide plate has engaging parts which engage with each of the pinching units at opposite positions in the other two end surfaces, and the pinching units have locking parts which are locked to each of the engaging parts.

According to the present invention, since the light guide plate and the pinching units are engaged (locked) to each other, it is possible to more stably maintain the position of the light guide plate with respect to the light source units.

In the light source device according to the present invention, the engaging part is a cutout part which penetrates the light guide plate in a thickness direction thereof, the holding member includes a support plate having one surface which supports the light guide plate, and the support plate has through holes at positions corresponding to the cutout parts. Further, in the light source device according to the present invention, the locking part includes: a movable plate piece which is attached on the other surface of the support plate so as to move along the other surface at a position corresponding to the through hole; and a protrusive plate piece which protrudes from the movable plate piece and extends into the holding member through the through hole, and has one surface abutting an inner portion of the cutout part.

According to the present invention, since the locking parts of the pinching units for pinching the light guide plate are locked to the cutout parts provided in the light guide plate, it is possible to more stably maintain the position of the light guide plate with respect to the light source units.

In the light source device according to the present invention, the movable plate piece includes: a plate piece which is disposed along the other surface of the support plate; and an elastic member which presses the plate piece in a direction approaching the movable plate piece of the other pinching unit.

According to the present invention, the movable plate pieces included in the pinching units (locking parts) are pressed in the direction approaching each other by the elastic members, and the light guide plate is pinched by the elastic members, such that the light guide plate can be stably pinched, and the position of the light guide plate can be stably maintained.

In the light source device according to the present invention, the pinching units are provided at a plurality of places.

According to the present invention, the light guide plate is pinched at the plurality of places, and thereby the position of the light guide plate with respect to the light source units can be rigidly fixed.

A display apparatus according to the present invention comprises: the above-described light source device; and a display panel which displays an image using light emitted from the light source device.

According to the present invention, by using the light source device in which the position of the light guide plate can be stably maintained, an image can be displayed using light uniformly emitted from the light source device, and display quality can be improved.

According to the present invention, in the light source device in which the light source units are disposed to face the two opposite end surfaces of the light guide plate, the light guide plate is pinched through the other two end surfaces, such that it is possible to constantly maintain a distance between the light guide plate and the respective light source units, and uniformly emit the light. In addition, the pinching units for pinching the light guide plate are provided on the other two end surface sides, such that the configuration of the two end surface sides in which the light source units are disposed can be simplified, and the light source device can be miniaturized. Thereby, even when the size of the light source device is limited, it is possible to appropriately maintain the position of the light guide plate.

The above and further objects and features will more fully be apparent from the following detailed description with accompanying drawings.

BRIEF DESCRIPTION OF THE SEVERAL VIEWS OF THE DRAWINGS

FIG. 6 is an explanatory view illustrating an attaching procedure of a pinching member;

DETAILED DESCRIPTION

The following will describe in detail a light source device and a display apparatus including the light source device according the present invention with reference to the drawings illustrating some embodiments thereof.

Embodiment 1

Figure 1:
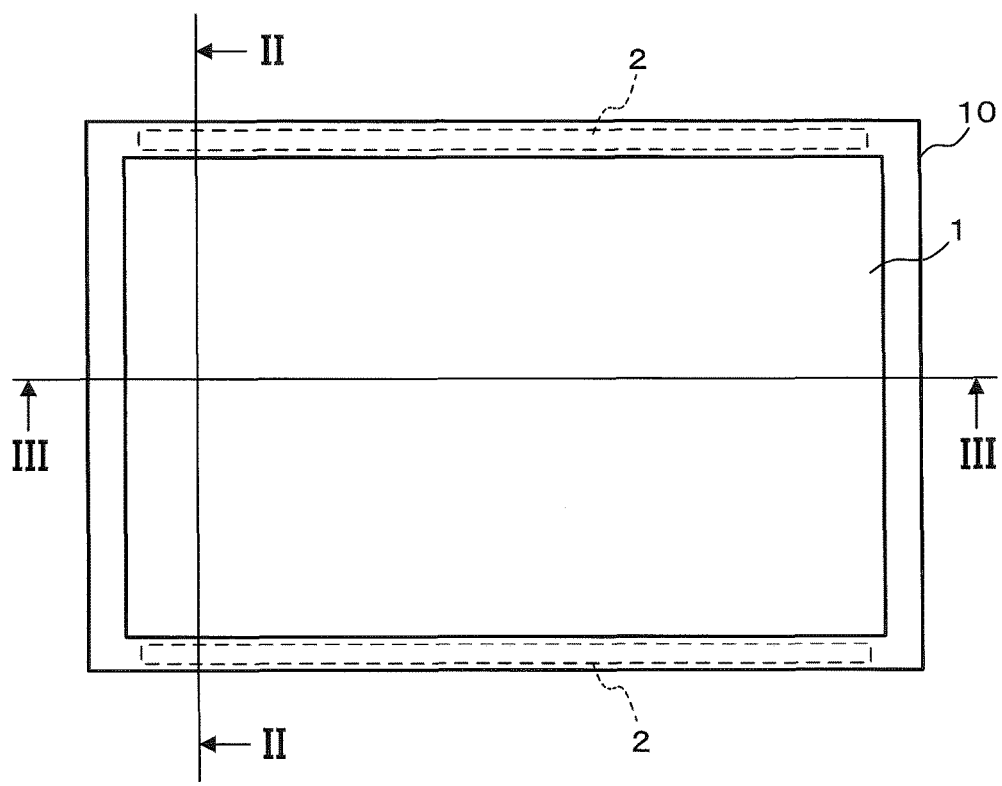
FIG. 1 is a front view of a display apparatus according to Embodiment 1.
Figure 2:
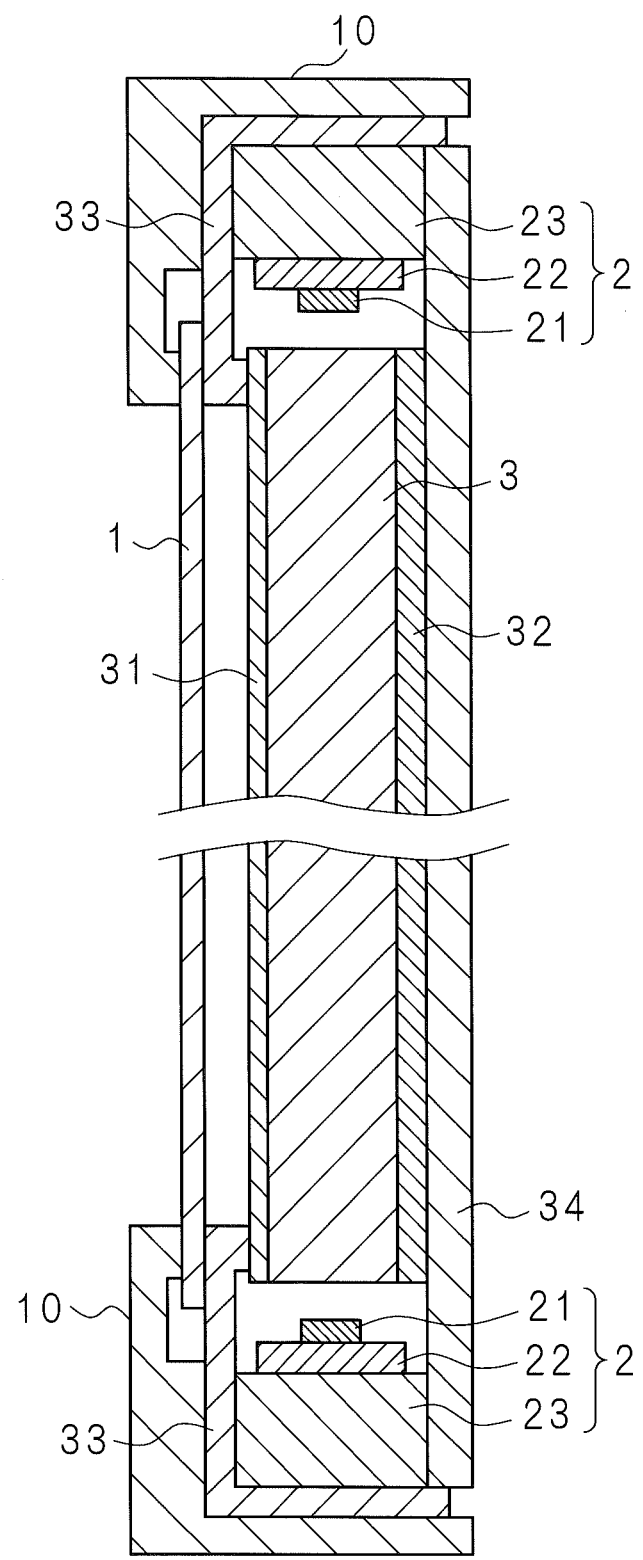
FIG. 2 is a longitudinal cross-sectional view taken on line II-II in FIG. 1.
Figure 3:
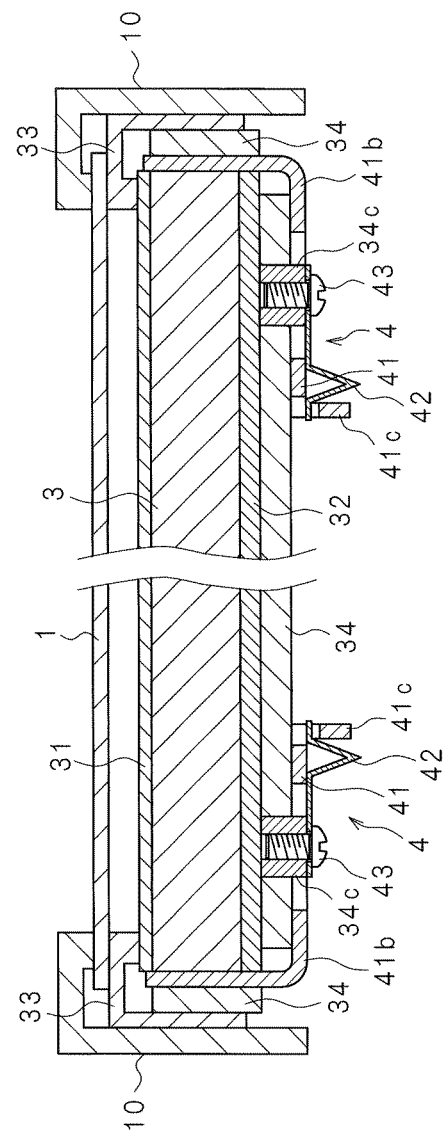
FIG. 3 is a transverse cross-sectional view taken on line III-III in FIG. 1.
Figure 4:
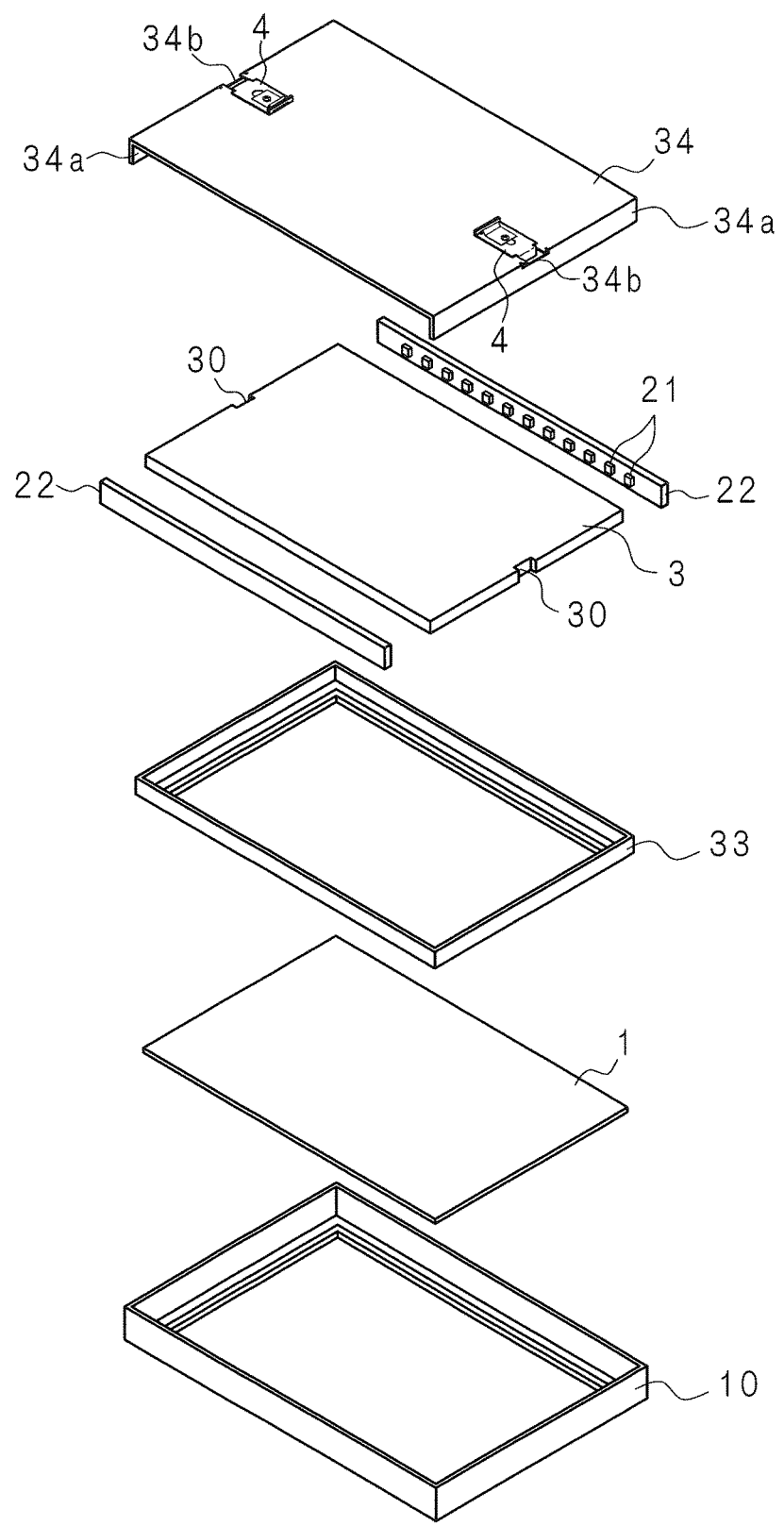
FIG. 4 is an exploded perspective view illustrating a configuration of major components of the display apparatus according to Embodiment 1.

FIG. 1 is a front view of a display apparatus according to Embodiment 1, FIG. 2 is a longitudinal cross-sectional view taken on line II-II in FIG. 1, FIG. 3 is a transverse cross-sectional view taken on line III-III in FIG. 1, and FIG. 4 is an exploded perspective view illustrating a configuration of major components of the display apparatus according to Embodiment 1. The display apparatus of Embodiment 1 is a liquid crystal display apparatus including an edge light type light source device. The display apparatus of Embodiment 1 includes a rectangular plate-shaped liquid crystal panel (display panel) 1, and the light source device which irradiates the liquid crystal panel 1 with light.

The liquid crystal panel 1 is formed by arranging a plurality of liquid crystal elements in a two-dimensional matrix shape, for example. Peripheral edges of the liquid crystal panel 1 are covered by a bezel 10 from a display screen side. The light source device includes two light source units 2, a light guide plate 3 and the like.

Each of the light source units 2 has a strip-shaped substrate 22, a light source 21 mounted on the substrate 22 in a longitudinal direction thereof, and a square column-shaped holding plate 23 which holds the substrate 22 and the light source 21. The light source 21 is, for example, a light emitting diode (LED), and has a plurality of light emitting diodes mounted on the substrate 22 in the longitudinal direction thereof. The light source 21 may be a cold cathode fluorescent lamp (CCFL), an external electrode fluorescent lamp (EEFL), a hot cathode fluorescent lamp (HCFL), or the like, in addition to the LED.

The light guide plate 3 is made of a high transparency synthetic resin such as an acrylic resin or a polycarbonate resin, and is formed in a rectangular plate shape. The light guide plate 3 has an optical sheet 31 adhered to one surface thereof, and a reflection sheet 32 adhered to the other surface thereof. The reflection sheet 32 is a sheet made of a synthetic resin having high reflection properties. A surface of the reflection sheet 32 facing the light guide plate 3 may be applied with a paint having excellent reflection properties. The optical sheet 31 is a sheet in which a diffusion sheet, prism sheet, polarizing sheet, and the like are laminated, for example, and emits the incident light as a uniform flat light. The diffusion sheet is, for example, a film made of polyethylene terephthalate (PET) or a film made of a polycarbonate resin, and has a function to diffuse the incident light. The prism sheet is formed by, for example, molding regular prism patterns with an acryl resin on one surface of a sheet material made of polyester. The polarizing sheet is, for example, a film made of polyethylene terephthalate, and has a function to convert the incident light into a linearly polarized light.

The light source units 2 having the above-described configuration are disposed to respectively face an upper end surface and a lower end surface of the light guide plate 3 so that the light from the light sources 21 is made incident thereon. A rear cover (support plate) 34 is a rectangular flat plate slightly larger than the light guide plate 3 on which the optical sheet 31 and the reflection sheet 32 are covered (hereinafter also briefly referred to as the light guide plate 3), and is provided with protruding plates 34a which vertically stand from both end sides in the same direction, respectively. The rear cover 34 supports the light guide plate 3 and the light source units 2 from the reflection sheet 32 side by one surface on a side in which the protruding plates 34a are formed. A backlight holding part 33 is formed in a rectangular frame shape slightly larger than the light guide plate 3, and covers the peripheral edges of the light guide plate 3 from the optical sheet 31 side. Further, the backlight holding part 33 covers the peripheral edges of the light guide plate 3 from the optical sheet 31 side, while the light guide plate 3 and the light source units 2 are supported by the rear cover 34. As described above, the light source units 2 and the light guide plate 3 are held by the backlight holding part 33 and the rear cover 34, and the backlight holding part 33 and the rear cover 34 serve as a holding member for holding the light source device.

By the above-described configuration, the light source device (backlight) which irradiates light to the liquid crystal panel 1 is achieved by the light source units 2, the light guide plate 3, the optical sheet 31, the reflection sheet 32, the backlight holding part 33 and the rear cover 34.

The liquid crystal panel 1 is formed in a rectangular plate shape having a size substantially the same as the light guide plate 3, and is placed on the backlight holding part 33 by facing one surface thereof to the light guide plate 3 (optical sheet 31). The bezel 10 is formed in the same rectangular frame shape having a size slightly larger than the backlight holding part 33, and covers the peripheral edges of the liquid crystal panel 1 placed on the light source device (backlight holding part 33) from an outside (display screen side). Thereby, the display apparatus as illustrated in FIGS. 1 to 3 is formed.

Next, a passage of light in the light source device will be described.

Light emitted from the light source units 2 (light sources 21) is respectively made incident on upper and lower end surfaces of the light guide plate 3, and is reflected by the reflection sheet 32, then passes through the light guide plate 3 and the optical sheet 31 to irradiate the liquid crystal panel 1 with flat light. Further, the light guide plate 3 may have patterns formed on a surface thereof on which the optical sheet 31 is provided so as to appropriately direct the emitted light in the liquid crystal panel 1 direction. In this case, the light emitted from the light guide plate 3 can be transferred to the optical sheet 31 more uniformly.

In Embodiment 1, as illustrated in FIG. 4, the light guide plate 3 is provided with cutout parts 30 which are formed in a rectangular cross-section at respective centers of end surfaces in which the light source units 2 are not disposed (a left end surface and a right end surface in FIG. 1). In addition, the rear cover 34 has pinching members (pinching units) 4 which are attached at positions corresponding to the respective cutout parts 30 of the light guide plate 3. The light guide plate 3 is fixed (pinched) by the pinching members 4 at positions in which the cutout parts (engaging parts) 30 are formed.

Figure 5:
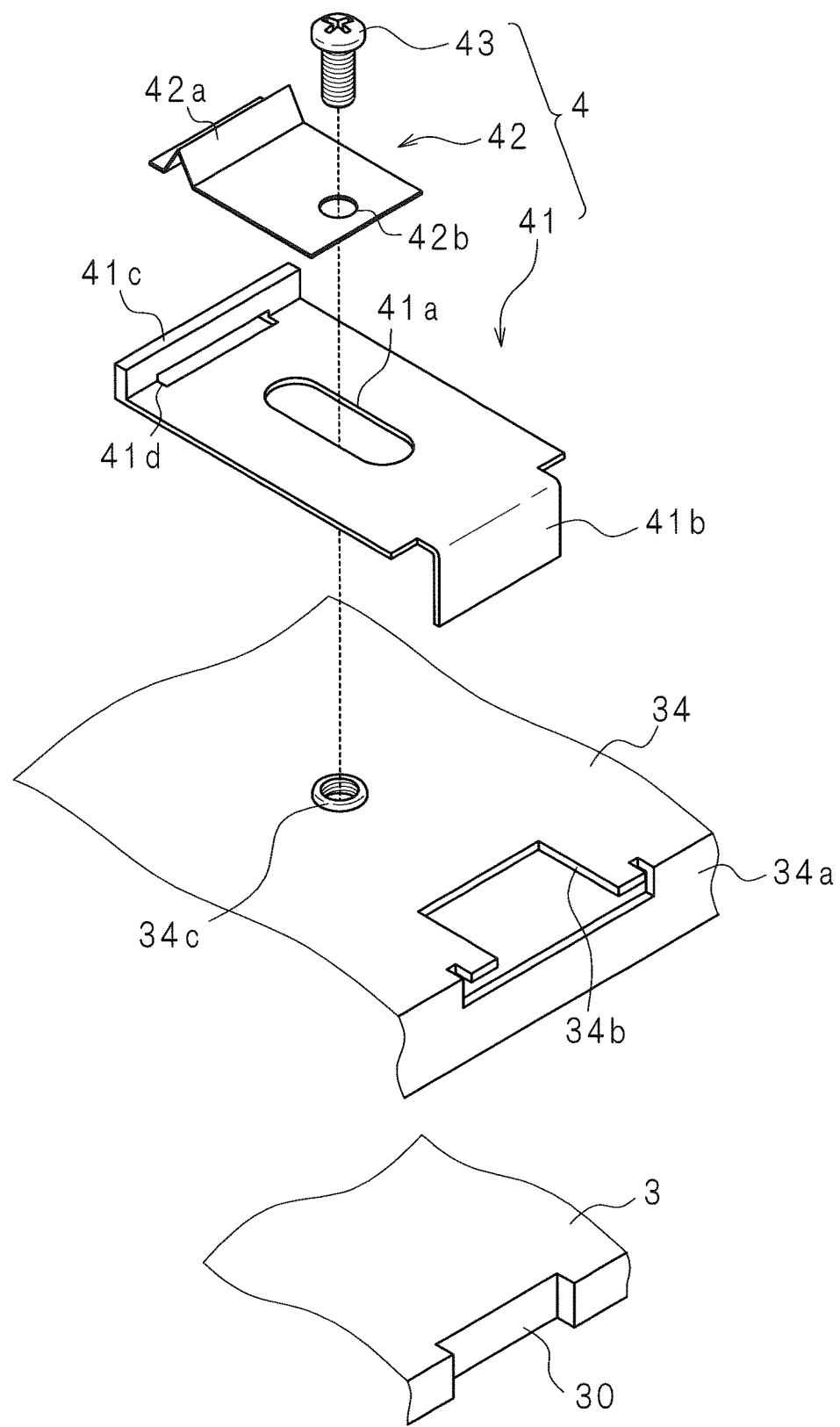
FIG. 5 is an explanatory view illustrating an attaching procedure of a pinching member.

FIGS. 5 and 6 are explanatory views illustrating an attaching procedure of the pinching members 4. Further, FIG. 5 illustrates a state before attaching the pinching member 4 to the rear cover 34, and FIG. 6 illustrates a state after attaching the pinching member 4 to the rear cover 34, respectively.

The rear cover 34 is provided with through holes 34b which extend inwardly from the protruding plates 34a in substantially the same width as the cutout parts 30, at the positions corresponding to the respective cutout parts 30 of the light guide plate 3. In addition, the rear cover 34 has caulking nuts 34c which are attached thereto by penetrating the rear cover 34 in a thickness direction thereof, at the positions slightly separated to an inside (left side) from the through holes 34b.

The pinching member 4 includes a movable plate piece 41, a leaf spring 42 which is an elastic member, and a bolt 43. The movable plate piece 41 is a metal plate piece formed in a rectangular shape, for example, and is provided with a long hole 41a which is formed at the center thereof with substantially the same width as the outer diameter of the caulking nuts 34c, and extends in the longitudinal direction of the movable plate piece 41. In addition, the movable plate piece 41 is provided with a protrusive plate piece 41b which is formed at one end side thereof with a width shorter than the end side, and slightly extends from one end portion thereof in the longitudinal direction of the movable plate piece 41, and then vertically extends by bending. Further, the movable plate piece 41 is provided with a grip plate piece 41c which is formed at the other end side thereof, and extends from the other end portion thereof in a direction opposite to the protrusive plate piece 41b. The grip plate piece 41c is provided with a through hole 41d which is formed in a base part thereof, and penetrates the grip plate piece 41c in the thickness direction thereof.

The movable plate piece 41 is placed on the rear cover 34, while the protrusive plate piece 41b passes through the through hole 34b, and the caulking nut 34c is fitted into the long hole 41a.

The leaf spring 42 is a rectangular metal plate piece, and has a bent part 42a formed in a V shape at one end portion thereof in the longitudinal direction. In addition, the leaf spring 42 is provided with a through hole 42b in the vicinity of the other end side (the other end portion in the longitudinal direction) opposite to the bent part 42a. The leaf spring 42 is placed on the movable plate piece 41, while an end portion of the side provided with the bent part 42a is fitted into the through hole 41d of the movable plate piece 41, and the through hole 42b is continued to an opening of the caulking nut 34c fitted into the long hole 41a of the movable plate piece 41. Thereafter, the bolt 43 is inserted into the through hole 42b from a top of the leaf spring 42, and is screwed with the caulking nut 34c, such that the pinching member 4 is attached to the rear cover 34.

Meanwhile, although only the pinching member 4 attached on a right end surface side of the rear cover 34 is illustrated in FIGS. 5 and 6, the caulking nut 34c is also provided on a left end surface side of the rear cover 34 at the same position, and the pinching member 4 having the same configuration is attached thereto in a mirror-reversed state.

Hereinafter, a procedure of attaching the rear cover 34 and the pinching members 4 having the above-described configuration to the light guide plate 3 will be described. When attaching the rear cover 34 on a back surface side of the light guide plate 3, first, a worker attaches two pinching members 4 to the rear cover 34, respectively.

When attaching two pinching members 4 to the rear cover 34, the worker places the rear cover 34 so that the back surface side thereof (a rear surface side of a surface in which the protruding plate 34a protrudes) is located at an upper side, and places the movable plate pieces 41 included in the respective pinching members 4 on the back surface of the rear cover 34. Specifically, the worker places the movable plate pieces 41 on the rear cover 34 by passing the protrusive plate pieces 41b of the respective movable plate pieces 41 through the through holes 34b of the rear cover 34, and passing the caulking nuts 34c provided on the rear cover 34 through the long holes 41a of the respective movable plate pieces 41.

Next, the worker places the leaf springs 42 on the respective movable plate pieces 41 so that the bent parts 42a thereof are located at an upper side. Specifically, the worker places the leaf springs 42 by fitting the end portions of the bent part 42a sides thereof into the through holes 41d of the respective movable plate pieces 41, so that the through holes 42b of the leaf springs 42 are continued to the openings of the respective caulking nuts 34c. Then, the worker inserts the bolts 43 into the through holes 42b from the top of the respective leaf springs 42, and screws the same with the caulking nuts 34c. Thereby, the pinching members 4 are attached to the rear cover 34.

When attaching the rear cover 34 having the pinching members 4 attached thereto as described above to the light guide plate 3, if the movable plate piece 41 does not move due to being fixed to the rear cover 34, the worker slightly loosens the bolt 43. The leaf spring 42 is fixed to the rear cover 34 by the bolt 43 and the caulking nut 34c at the position of the through hole 42b. Meanwhile, when the bolt 43 is slightly loosened, the movable plate piece 41 can move (slide) along the rear cover 34 within a range in which the bent part 42a of the leaf spring 42 can be bent and a range in which the caulking nut 34c can move along the long hole 41a of the movable plate piece 41. In this case, since movement of the movable plate pieces 41 with respect to the caulking nuts 34c are guided by the long holes 41a of the movable plate pieces 41, the two movable plate pieces 41 can move in a direction being separated from or approaching each other (in a horizontal direction).

The worker holds the grip plate pieces 41c of the respective movable plate pieces 41 and attaches the rear cover 34 to the back surface of the light guide plate 3, while the two pinching members 4 (movable plate pieces 41) are moved in the direction being separated from each other. The worker abuts the protrusive plate pieces 41b of the two movable plate pieces 41 to the places of the light guide plate 3 in which the cutout parts 30 are formed (inner portions of the cutout parts 30), and then releases his hand from the grip plate pieces 41c. Further, the protrusive plate pieces 41b of the two movable plate pieces 41 abut inner portions (bottom portions) of the cutout parts 30 of the light guide plate 3 by one surface of each thereof facing thereto.

After the worker releases his hand from the grip plate pieces 41c, the two pinching members 4 (movable plate pieces 41) return in the direction approaching each other by the elasticity of the leaf springs 42, such that the light guide plate 3 can be pinched by the two pinching members 4, and the vertical position of the light guide plate 3 can be fixed. Further, when fixing the movable plate pieces 41 to the rear cover 34, the worker screws the bolts 43 with the caulking nuts 34c.

In Embodiment 1, the cutout parts 30 are provided at the places in which the light guide plate 3 is pinched by the pinching members 4 (movable plate pieces 41). Thereby, the protrusive plate pieces 41b of the movable plate pieces 41 can appropriately abut the inner portions of the cutout parts 30 to pinch the light guide plate 3, as well as, since the light guide plate 3 is engaged to the upper end surface of the protrusive plate piece (a locking part) 41b by the cutout parts 30 to be stopped, it is possible to prevent the light guide plate 3 from falling due to its own weight.

In Embodiment 1, since the light guide plate 3 is pinched from the horizontal direction by the pinching members 4 provided on the rear cover 34, it is possible to fix the vertical position of the light guide plate 3. Further, when the movable plate piece 41 is in a state capable of moving by slightly loosening the bolt 43, even if the light guide plate 3 is expanded due to heat from the light source units 2, the expansion is absorbed by the elasticity of the leaf spring 42, and thereby it is possible to stably hold the light guide plate 3. Thereby, a distance between the light guide plate 3 and the two light source units 2 is constantly maintained, such that light emitted from the light guide plate 3 becomes more uniform. In addition, when the display apparatus is formed by using the light source device as described above, it is possible to illuminate the liquid crystal panel 1 with uniform light, and suppress luminance unevenness in a screen with improved display quality. Further, due to the vertical position of the light guide plate 3 being fixed, even if the light guide plate 3 is expanded due to the heat from the light source units 2, since it is expanded in a vertical direction with respect to the pinching members 4, it is possible to prevent the light guide plate 3 from contacting with the light source units 2, and prevent the light source units 2 (light sources 21) from being damaged. Furthermore, with respect to the light guide plate 3, the pinching members 4 are provided at places in which the light source units 2 are not disposed, such that the configuration of the side in which the light source units 2 are disposed is not complicated, and the light source device (backlight) can be miniaturized. In Embodiment 1, since each component (movable plate piece 41 and the leaf spring 42) of the pinching member 4 is made of metal, it is possible to achieve the strength to an extent capable of sufficiently pinching the light guide plate 3.

In Embodiment 1, two pinching members 4 are attached to the respective centers of the left and right end portions of the rear cover 34, and the light guide plate 3 is pinched by the two pinching members 4 from the left and right, such that it is possible to stably pinch the light guide plate 3, and fix the vertical position of the light guide plate 3. Further, the light source device may have a configuration in which the light guide plate 3 is pinched at a plurality of positions.

In Embodiment 1, the cutout part 30 provided in the light guide plate 3 has a size enough to be hidden by the backlight holding part 33 and the bezel 10 when viewed from the display screen side. Thereby, light from the light source units 2 may not leak through the cutout parts 30, and a decrease in display quality can be prevented. In addition, since the light guide plate 3 is pinched by the movable plate pieces 41 of the pinching members 4, the cutout parts 30 provided in the light guide plate 3 may have a size substantially the same as the thickness of the movable plate pieces 41 (protrusive plate pieces 41b). Thereby, a depth of the cutout parts 30 of the light guide plate 3 can be formed small, and thus the width of the bezel 10 can also be formed fine, and the frames can be narrowed.

Embodiment 2

Hereinafter, a display apparatus according to Embodiment 2 will be described. The display apparatus of Embodiment 2 is different from the above-described display apparatus of Embodiment 1 in terms of the configuration of a pinching member 4 attached to the rear cover 34. Accordingly, only the pinching member 4 will be described, and the components having configurations common to Embodiment 1 are denoted by the same reference numerals and will not be described.

Figure 7:
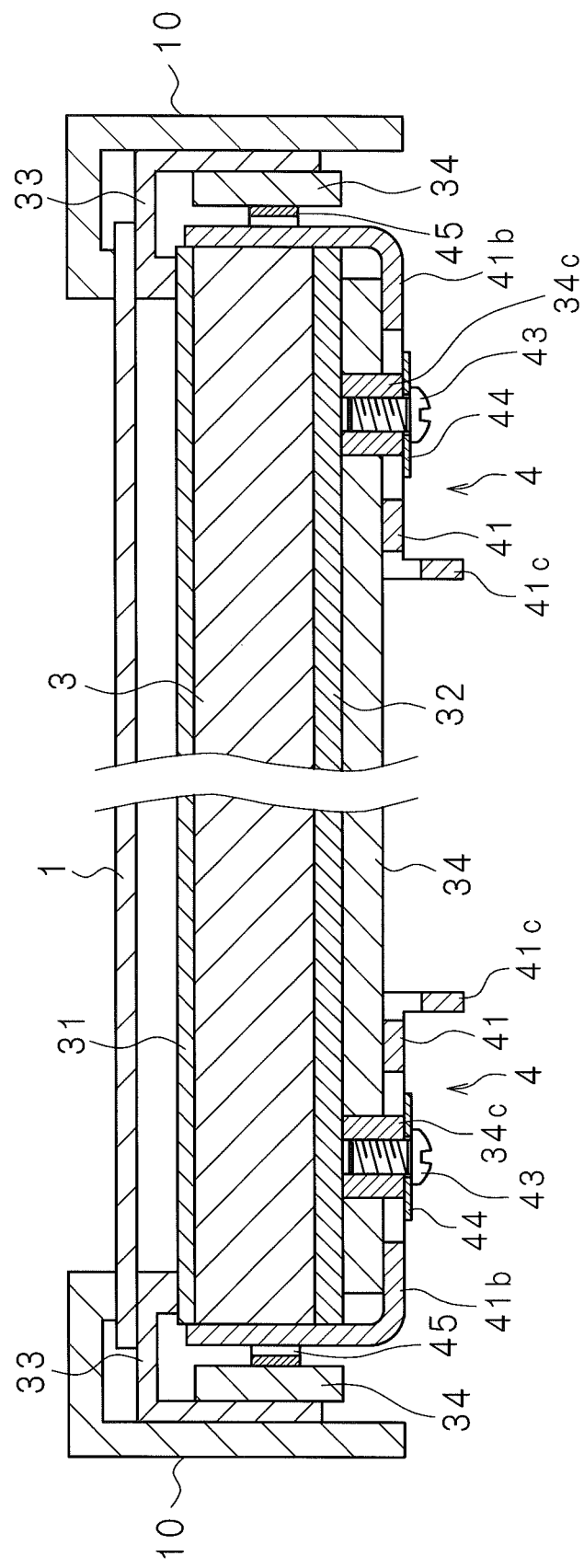
FIG. 7 is a transverse cross-sectional view taken on line III-III in FIG. 1.
Figure 8:
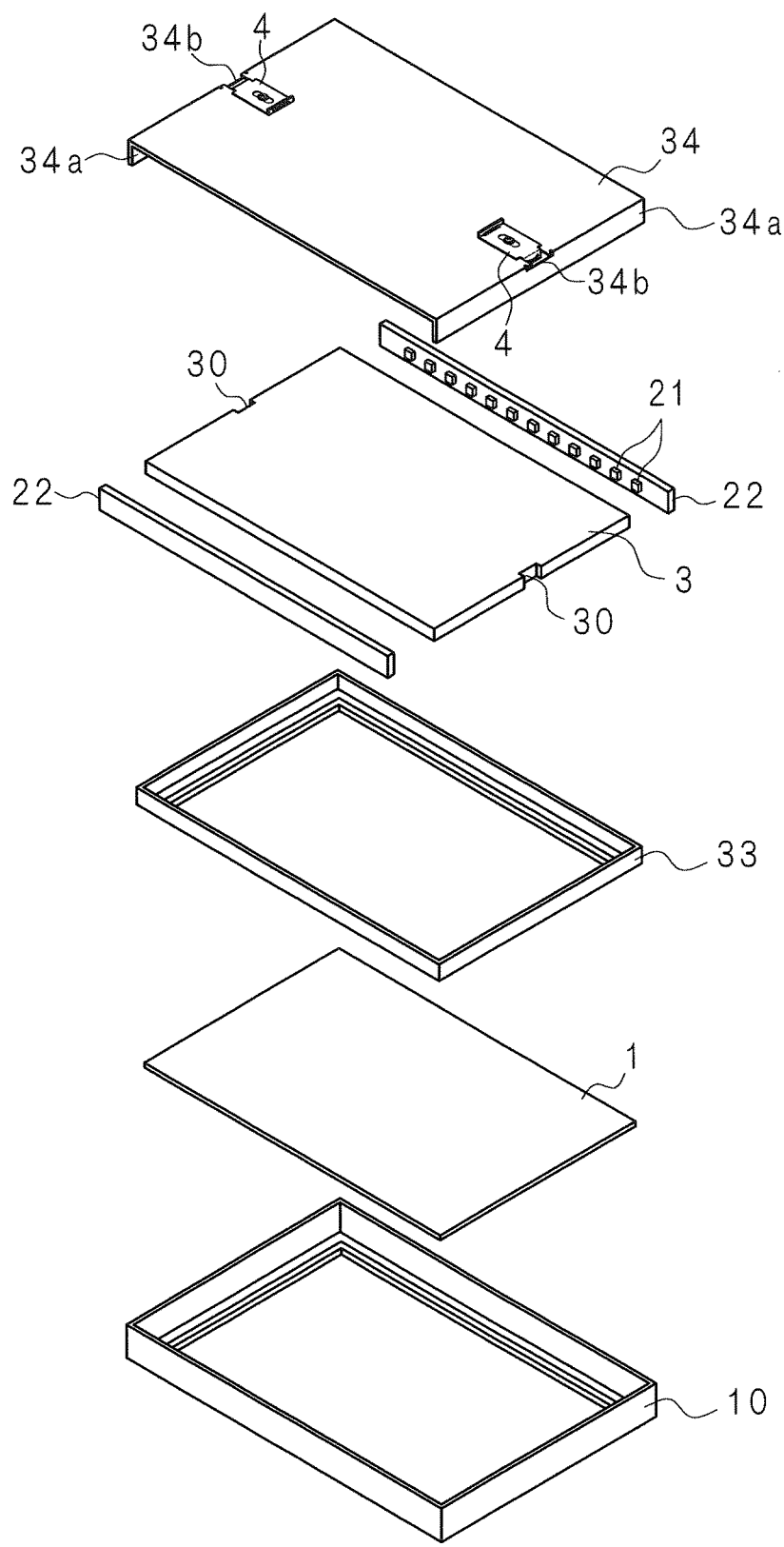
FIG. 8 is an exploded perspective view illustrating a configuration of main components of a display apparatus according to Embodiment 2.
Figure 9:
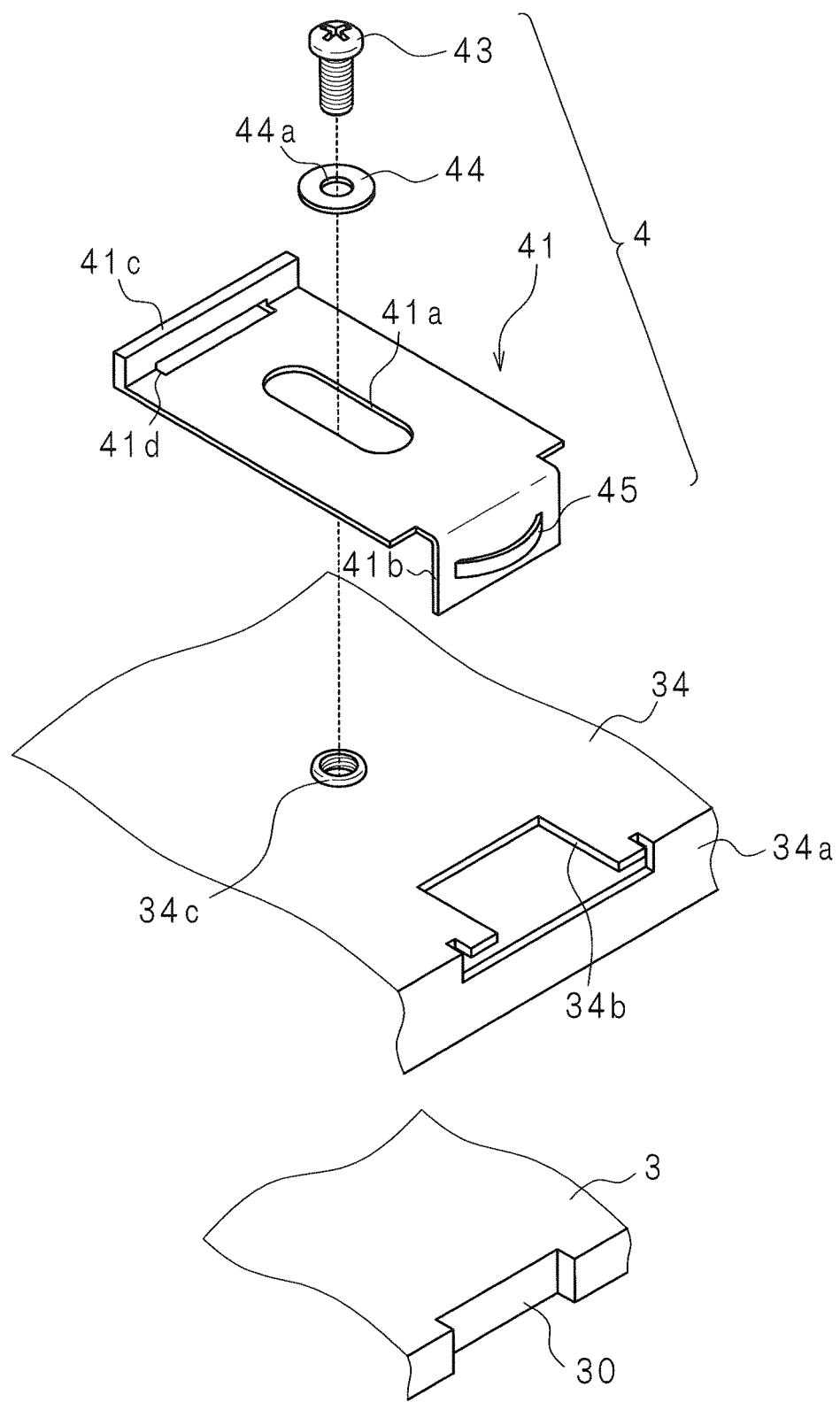
FIG. 9 is an explanatory view illustrating an attaching procedure of a pinching member of Embodiment 2.
Figure 10:
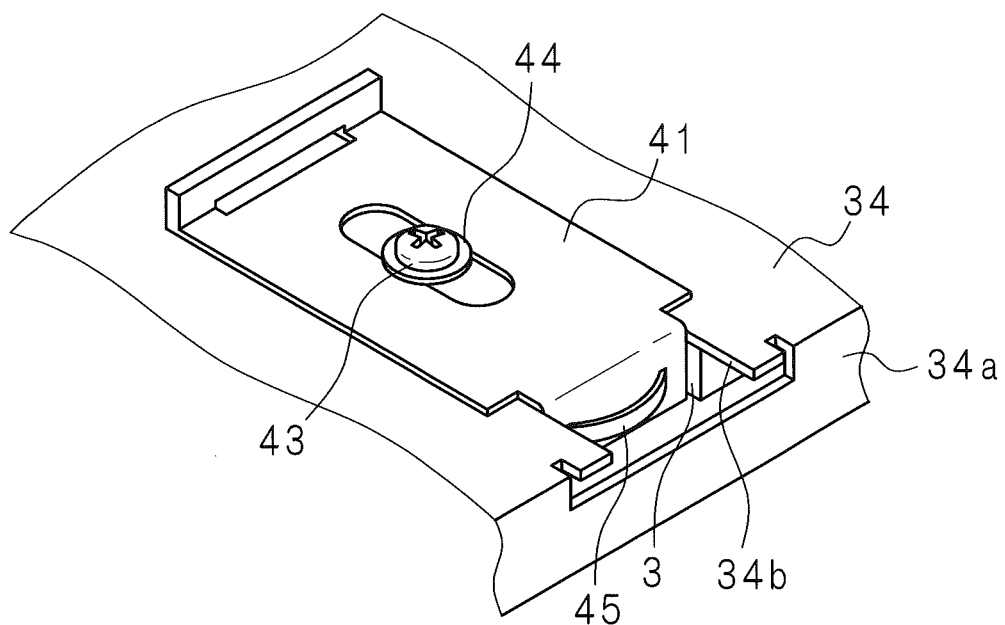
FIG. 10 is an explanatory view illustrating an attaching procedure of a pinching member of Embodiment 2.

FIG. 7 is a transverse cross-sectional view taken on line III-III in FIG. 1, FIG. 8 is an exploded perspective view illustrating a configuration of main components of the display apparatus according to Embodiment 2, and FIGS. 9 and 10 are explanatory views illustrating an attaching procedure of the pinching member 4 of Embodiment 2.

The pinching member 4 of Embodiment 2 includes a washer 44 and a curved leaf spring 45 instead of the leaf spring 42 in Embodiment 1.

The curved leaf spring 45 is formed by bending a rectangular metal plate piece. The movable plate piece 41 is formed in the same shape as the movable plate piece 41 of the above-described Embodiment 1, and the curved leaf spring 45 is provided on an outer surface (a surface continued to the upper surface) of the protrusive plate piece 41b in the longitudinal direction. The movable plate piece 41 is placed on the rear cover 34, similar to the above-described Embodiment 1, while the protrusive plate piece 41b passes through the through hole 34b, and the caulking nut 34c is fitted into the long hole 41a.

The washer 44 is a disc-shaped metal plate piece, and is provided with a through hole 44a at a center thereof. The washer 44 is placed on the movable plate piece 41, while the through hole 44a is continued to the opening of the caulking nut 34c fitted into the long hole 41a of the movable plate piece 41. Thereafter, the bolt 43 is inserted into the through hole 44a from the top of the washer 44, and is screwed with the caulking nut 34c, such that the pinching member 4 is attached to the rear cover 34.

Hereinafter, in Embodiment 2, a procedure of attaching the rear cover 34 and the pinching members 4 to the light guide plate 3 will be described. Also in Embodiment 2, when attaching the rear cover 34 on a back surface side of the light guide plate 3, first, the worker attaches two pinching members 4 to the rear cover 34, respectively.

When attaching two pinching members 4 to the rear cover 34, similar to the above-described procedure of Embodiment 1, the worker places the movable plate pieces 41 included in the respective pinching members 4 on the back surface of the rear cover 34 (the rear surface of a surface in which the protruding plate 34a protrudes). In this case, the curved leaf springs 45 provided on the protrusive plate pieces 41b of the movable plate pieces 41 may not abut the rear cover 34 (protruding plates 34a). Next, the worker places the washers 44 on the respective movable plate pieces 41 so that the through holes 44a are continued to the openings of the respective caulking nuts 34c. Then, the worker inserts the bolts 43 into the through holes 44a from the top of the washers 44, and screws the same with the caulking nuts 34c. Thereby, the pinching members 4 are attached to the rear cover 34.

When attaching the rear cover 34 having the pinching members 4 attached thereto as described above to the light guide plate 3, similar to the above-described procedure of Embodiment 1, if the movable plate piece 41 does not move due to being fixed to the rear cover 34, the worker slightly loosens the bolt 43. In Embodiment 2, when the bolt 43 is slightly loosened, the movable plate piece 41 can move along the rear cover 34 within a range in which the curved leaf spring 45 becomes in a linear shape and a range in which the caulking nut 34c can move along the long hole 41a of the movable plate piece 41. Also in Embodiment 2, the movement of the movable plate pieces 41 with respect to the caulking nuts 34c are guided by the long holes 41a of the movable plate pieces 41.

The worker holds the grip plate pieces 41c of the respective movable plate pieces 41 and attaches the rear cover 34 to the back surface of the light guide plate 3, while the two pinching members 4 (movable plate pieces 41) are moved in the direction being separated from each other. The worker abuts the protrusive plate pieces 41b of the two movable plate pieces 41 to the places of the light guide plate 3 in which the cutout parts 30 are formed (inner portions of the cutout parts 30), and then releases his hand from the grip plate pieces 41c.

After the worker releases his hand from the grip plate pieces 41c, the two pinching members 4 (movable plate pieces 41) return in the direction approaching each other by elasticity of the curved leaf springs 45, such that the light guide plate 3 can be pinched by the two pinching members 4, and the vertical position of the light guide plate 3 can be fixed. Then, when fixing the movable plate pieces 41 to the rear cover 34, the worker screws the bolts 43 with the caulking nuts 34c.

By the above-described configuration, also in Embodiment 2, since the light guide plate 3 is pinched from the horizontal direction by the pinching members 4 provided on the rear cover 34, it is possible to fix the vertical position of the light guide plate 3. Further, also in Embodiment 2, when the movable plate piece 41 is in a state capable of moving by slightly loosening the bolt 43, even if the light guide plate 3 is expanded due to heat from the light source unit 2, the expansion is absorbed by the elasticity of the curved leaf spring 45, and thereby it is possible to stably hold the light guide plate 3. Thereby, it is possible to obtain the same effects as described in the above Embodiment 1, for example, the distance between the light guide plate 3 and the two light source units 2 is constantly maintained, and thereby the light emitted from the light guide plate 3 becomes more uniform.

Further, also in Embodiment 2, the light source device may have a configuration in which the light guide plate 3 is pinched at a plurality of positions.

In the above-described Embodiments 1 and 2, the light source device according to the present invention is described as an example of the display apparatus including the liquid crystal panel 1 and the light source device, but the present invention may be applied to a lighting apparatus (light source device) which does not have the liquid crystal panel 1.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:
1. A light source device comprising:
a rectangular light guide plate;
light source units which are disposed to face two opposite end surfaces of the light guide plate;
a holding member which holds the light source units and the light guide plate; and pinching units which are attached to the holding member to pinch the other two end surfaces of the light guide plate, wherein light made incident on the two opposite end surfaces of the light guide plate from the light source units is emitted from one surface of the light guide plate, the light guide plate has engaging parts which engage with each of the pinching units at opposite positions in the other two end surfaces, and the pinching units have locking parts which are locked to each of the engaging parts.

2. The light source device according to claim 1, wherein each of the pinching units has an elastic member biased in a direction approaching each other.

3. The light source device according to claim 1, wherein the engaging part is a cutout part which penetrates the light guide plate in a thickness direction thereof, the holding member includes a support plate having one surface which supports the light guide plate, the support plate has through holes at positions corresponding to each of the cutout parts, and the locking part includes: a movable plate piece which is attached on the other surface of the support plate so as to move along the other surface at a position corresponding to the through hole; and a protrusive plate piece which protrudes from the movable plate piece and extends into the holding member through the through hole, and has one surface abutting an inner portion of the cutout part.

4. The light source device according to claim 3, wherein the movable plate piece includes: a plate piece which is disposed along the other surface of the support plate; and an elastic member which presses the plate piece in a direction approaching the movable plate piece of the other pinching unit.

5. The light source device according to claim 1, wherein the pinching units are provided at a plurality of places.

6. A display apparatus comprising:

the light source device according to claim 1; and a display panel which displays an image using light emitted from the light source device.

* * * * *